(12) United States Patent
Menke, III

(10) Patent No.: US 10,808,909 B2
(45) Date of Patent: Oct. 20, 2020

(54) LIGHT BAR FOR A VEHICLE

(71) Applicant: PowerArc, Inc., Shrewsbury, MO (US)

(72) Inventor: W. Kenneth Menke, III, St. Louis, MO (US)

(73) Assignee: Powerarc, Inc., Shrewsbury, MO (US)

( * ) Notice: Subject to any disclaimer, the term of this patent is extended or adjusted under 35 U.S.C. 154(b) by 80 days.

(21) Appl. No.: 16/190,786

(22) Filed: Nov. 14, 2018

(65) Prior Publication Data
US 2020/0149704 A1 May 14, 2020

(51) Int. Cl.
| B60Q 1/26 | (2006.01) |
| F21S 45/10 | (2018.01) |
| F21V 15/01 | (2006.01) |
| F21S 43/20 | (2018.01) |

(52) U.S. Cl.
CPC ........... *F21S 45/10* (2018.01); *B60Q 1/26* (2013.01); *F21S 43/26* (2018.01); *F21V 15/012* (2013.01)

(58) Field of Classification Search
CPC .... B60Q 1/26; B60Q 1/52; F21S 41/19; F21S 41/143; F21S 43/19; F21S 45/10; F21V 19/003
See application file for complete search history.

(56) References Cited

U.S. PATENT DOCUMENTS

| | | | |
|---|---|---|---|
| 4,620,268 A * | 10/1986 | Ferenc | B60Q 1/2611 362/517 |
| 5,988,839 A * | 11/1999 | Pokorney | B60Q 1/30 362/493 |
| 6,722,776 B1 | 4/2004 | Lyons et al. | |
| 7,404,658 B1 | 7/2008 | Lyons et al. | |
| 7,419,286 B2 | 9/2008 | Stein | |
| 7,611,269 B1 * | 11/2009 | Lyons | B60Q 1/2611 362/238 |
| 7,641,361 B2 * | 1/2010 | Wedell | F21K 9/00 362/240 |
| 7,677,761 B2 * | 3/2010 | Chiang | F21K 9/00 362/240 |
| 7,810,968 B1 * | 10/2010 | Walker | F21V 21/30 362/431 |
| 8,123,378 B1 * | 2/2012 | Ruberg | F21S 8/088 362/249.02 |
| 8,147,108 B2 | 4/2012 | Stein et al. | |
| 8,210,725 B2 | 7/2012 | Datz et al. | |
| 8,342,725 B2 | 1/2013 | Stein et al. | |
| 8,425,098 B2 | 4/2013 | Menke, III | |
| 2009/0116257 A1 | 5/2009 | Rosemeyer et al. | |
| 2011/0089838 A1 * | 4/2011 | Pickard | F21V 29/763 315/113 |

\* cited by examiner

*Primary Examiner* — Julie A Bannan
(74) *Attorney, Agent, or Firm* — Joseph M. Rolnicki; Evans & Dixon, L.L.C.

(57) ABSTRACT

The construction of a light mounting platform or a skeletal frame of a light bar is easily expanded volumetrically in length, width and height to accommodate the mounting of a variety of different visual and audible warning devices, illumination devices as well as a variety of auxiliary devices used on emergency vehicles, utility vehicles, as well as other types of vehicles by switching between pluralities of vertical support columns having different vertical height dimensions and switching between pluralities of bottom plates and top plates having different peripheral configurations with different length and/or width dimensions.

30 Claims, 15 Drawing Sheets

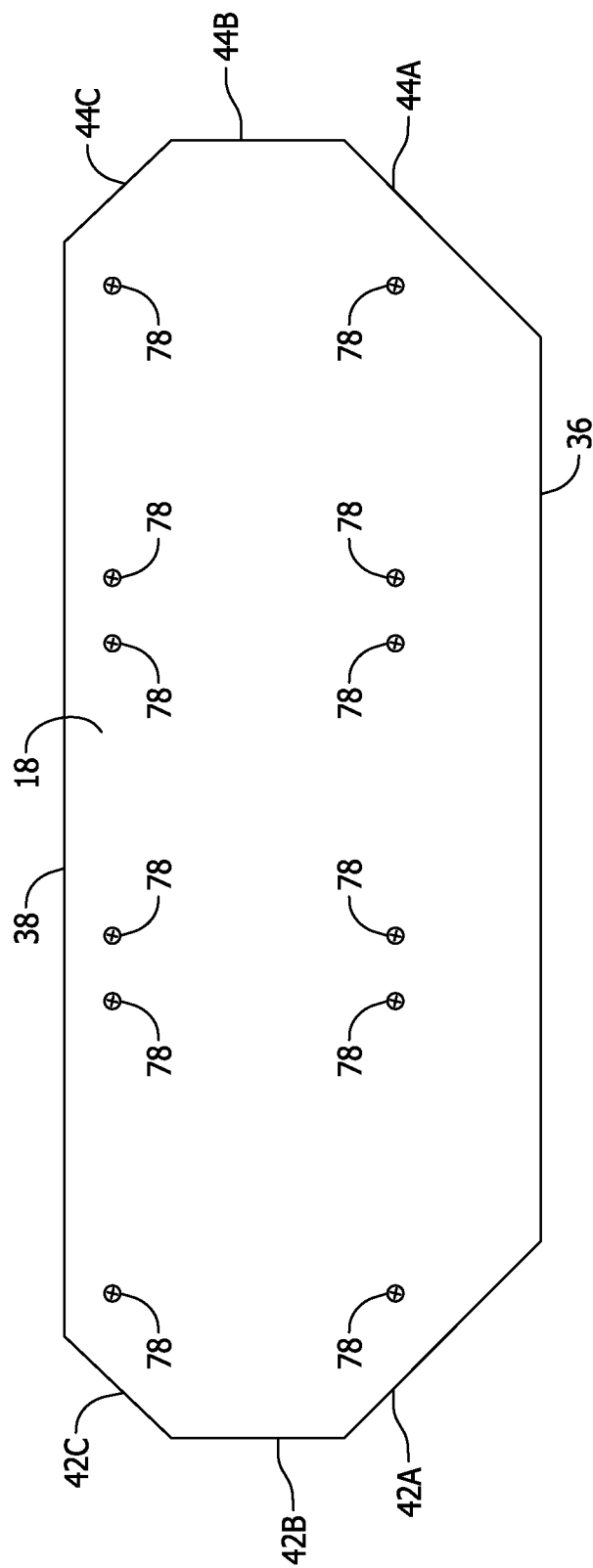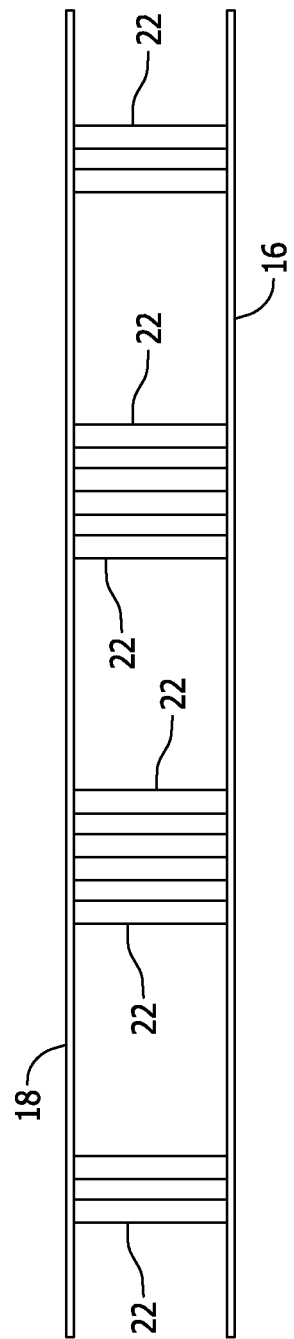
FIG. 5
FIG. 6

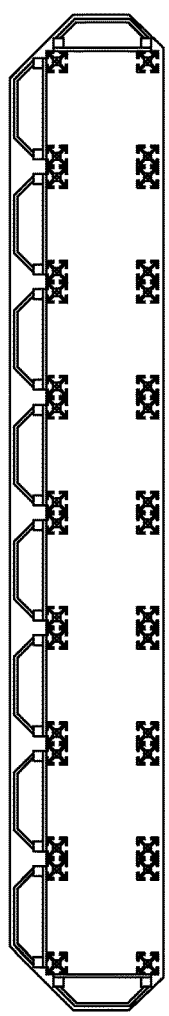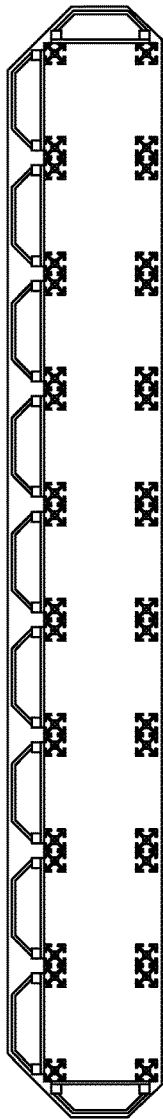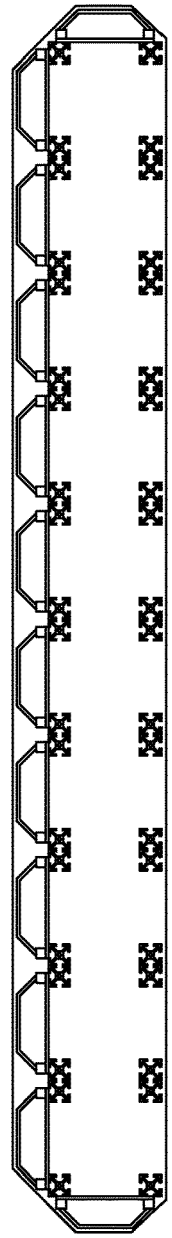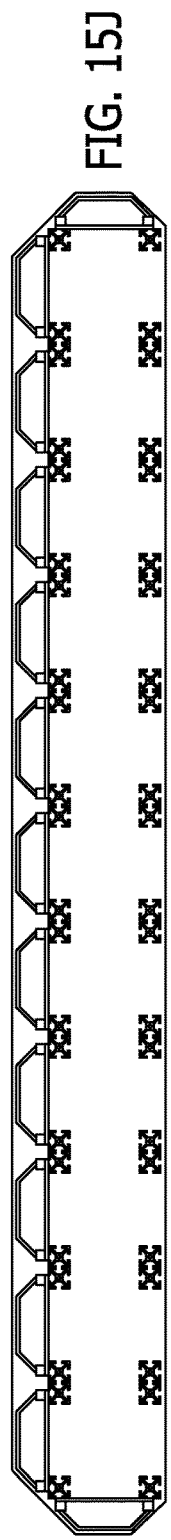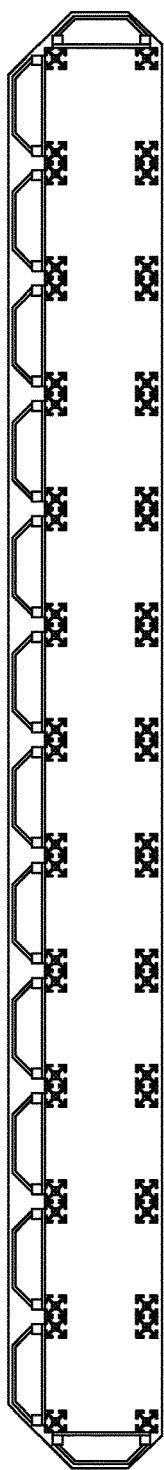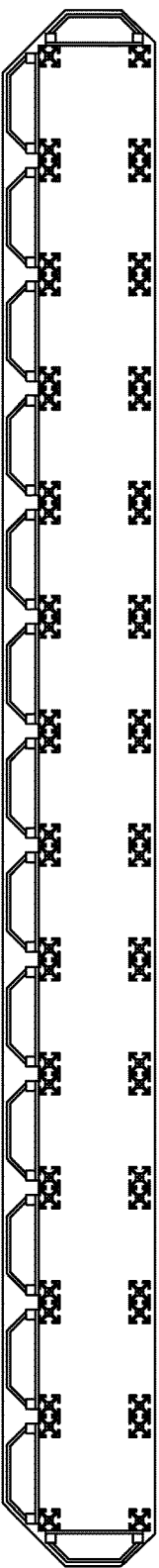

LIGHT BAR FOR A VEHICLE

FIELD

This disclosure pertains to the construction of a light bar that is designed for use on emergency and utility vehicles. In particular, this disclosure pertains to the construction of a light mounting platform or a skeletal frame of a light bar that can easily expand volumetrically in length, width and height to accommodate the mounting of a variety of different visual and audible warning devices, illumination devices, as well as a variety of auxiliary devices used on emergency vehicles and utility vehicles, as well as other types of vehicles.

BACKGROUND

The original light bar concept for use on the exterior of emergency and utility vehicles, as well as other types of vehicles was introduced in the early 1970's. The typical light bar construction is comprised of an elongate frame or support bar supporting one or more optical signaling devices, audible signaling devices, as well as other various types of auxiliary devices used on emergency and utility vehicles, as well as other types of vehicles. The traditional light bar could grow in length by adjusting the length of the elongate frame or support bar, but the typical light bar could not grow in all three planes, that is a typical light bar could not grow in length, width and height.

SUMMARY

The light bar of this disclosure overcomes the shortcomings of prior light bar constructions by providing a light bar having a mounting platform or skeletal frame that can easily expand volumetrically, in length, width and height. The ability of the skeletal frame to expand volumetrically enables the skeletal frame to be constructed to mount a variety of different visual and audible warning devices as well as a variety of auxiliary devices used on emergency vehicles, utility vehicles, and other types of vehicles. The skeletal frame volumetric expansion does not require complex or expensive tooling, and the skeletal frame can be constructed to any desired length, height, or depth, without losing strength. The skeletal frame could also be modified to address mounting constraints imposed by the vehicle to which the skeletal frame is to be attached. For example, the skeletal frame could be modified to handle curved surfaces on the vehicle to which it will be attached as well as bends and changes in elevation on the vehicle surface to which the skeletal frame is to be attached.

The skeletal frame of the light bar for a vehicle is comprised of a bottom plate, a top plate, and a plurality of vertical support columns. The skeletal frame could also include a mid plate between the bottom plate and top plate. Furthermore, the skeletal frame could be comprised of multiple plates between the bottom plate and the top plate. The bottom plate, the top plate and the plurality of vertical support columns are assembled together to produce the skeletal frame of the light bar.

The bottom plate has a peripheral edge that defines a peripheral configuration of the bottom plate. The peripheral edge of the bottom plate is comprised of a forward edge and a rearward edge opposite the forward edge, and a left side edge and a right side edge opposite the left side edge.

The top plate has a peripheral edge that defines a peripheral configuration of the top plate. The peripheral edge of the top plate is comprised of a forward edge and a rearward edge opposite the forward edge, and a left side edge and a right side edge opposite the left side edge. The forward edge of the top plate and the forward edge of the bottom plate are parallel and positioned in a vertical plane.

The peripheral configuration of the bottom plate and the peripheral configuration of the top plate are a same peripheral configuration.

The plurality of vertical support columns are secured between the bottom plate and the top plate, securing the bottom plate to the top plate. Each of the vertical support columns has a forward surface that is directed toward the forward edge of the bottom plate and is directed toward the forward edge of the top plate. Each of the vertical support columns has a T-slot in the forward surface of the vertical support column.

Together the bottom plate, the top plate and the plurality of vertical support columns form a rigid skeletal framework of the light bar.

A plurality of illumination devices are mounted on the skeletal framework of the light bar. Each illumination device has a forward lens surface that is configured for projecting illumination and a rearward mounting surface opposite the forward lens surface. The rearward mounting surface has at least two T-fasteners projecting from the rearward mounting surface. The T-fasteners are received in sliding engagement in the T-slots of two adjacent vertical support columns of the plurality of vertical support columns in mounting the illumination device to the two adjacent vertical support columns.

The plurality of vertical support columns is comprised of a plurality of first vertical support columns and a plurality of second vertical support columns. Each first vertical support column of the plurality of first vertical support columns has a first vertical height dimension. Each second vertical support column of the plurality of second vertical support columns has a second vertical height dimension, where the second vertical height dimension is twice the first vertical height dimension. Constructing the skeletal frame of the light bar with the bottom plate, the top plate, and the plurality of first vertical support columns gives the skeletal frame a length dimension of the bottom plate and top plate, a width dimension of the bottom plate and top plate, and a height dimension of the plurality of first vertical support columns. Replacing the plurality of first vertical support columns with the plurality of second vertical support columns gives the skeletal frame a length dimension of the bottom plate and top plate, a width dimension of the bottom plate and top plate, and a vertical height dimension of the second vertical support columns. Constructing the skeletal frame of the light bar by replacing the plurality of first vertical support columns with the plurality of second vertical support columns adjusts the height dimension of the skeletal frame upwardly to the second vertical height dimension of the plurality of second vertical support columns. Constructing the skeletal frame of the light bar with the bottom plate, the top plate, and the plurality of first vertical support columns adjusts the vertical height dimension of the skeletal frame from the second vertical height dimension of the plurality of second vertical support columns downwardly to the first vertical height dimension of the plurality of first vertical support columns. In this manner, the volume of the skeletal frame of the light bar can be expanded upwardly in height, or retracted downwardly in height, respectively.

In addition to the skeletal frame of the light bar being constructed with the bottom plate having a first peripheral configuration and a top plate having a first peripheral configuration, the skeletal frame could be constructed with a bottom plate having a second peripheral configuration and a top plate having a second peripheral configuration, where the second peripheral configurations of the bottom plate and the top plate are the same peripheral configurations, and the second peripheral configurations of the bottom plate and top plate are different from the first peripheral configurations of the bottom plate and top plate. For example, the second peripheral configurations of the bottom plate and the top plate have a larger length dimension and/or a larger width dimension that the first peripheral configurations of the bottom plate and the top plate. In this manner the volume of the skeletal frame of the light bar can be adjusted by increasing the length dimension of the bottom plate and top plate of the light bar and/or increasing the width dimension of the bottom plate and top plate of the light bar.

In the manner discussed above, the light bar for a vehicle can easily be adjusted volumetrically, in length, width and height, to mount a variety of different illumination devices, visual devices and audible warning devices, as well as a variety of auxiliary devices on the light bar. The skeletal frame volumetric expansion does not require complex or expensive tooling, and can be made to any desired length, height, or width, without sacrificing the strength of the skeletal frame.

BRIEF DESCRIPTION OF THE DRAWINGS

Further features of the light bar of this disclosure are set forth in the following detailed description of the light bar and in the drawing figures.

FIG. 5 is a representation of a plan view of a top plate of the light bar.

FIG. 6 is a representation of an elevation view of a skeletal frame of the light bar constructed with the bottom plate of FIG. 4 and the top plate of FIG. 5.

FIGS. 15A-15L are representations of different light bar construction configurations having different length dimensions.

DETAILED DESCRIPTION

Figure 1:
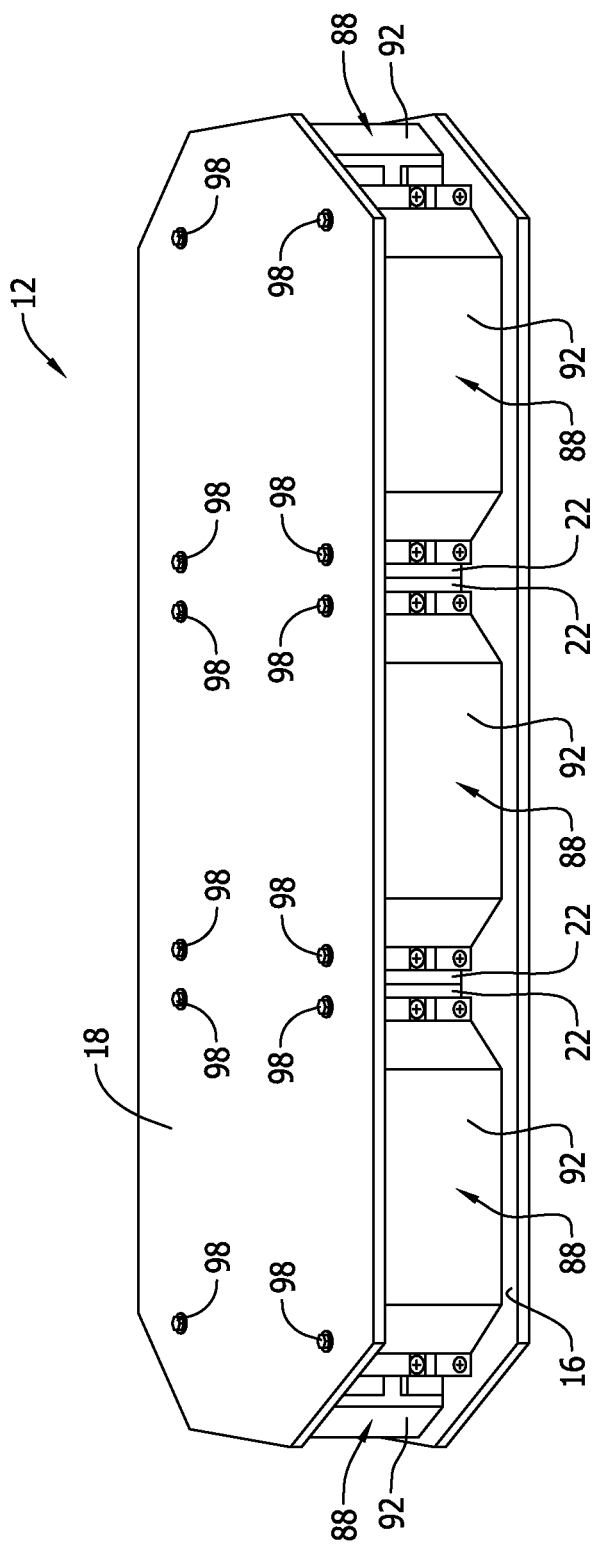
FIG. 1 is a representation of a front perspective view of one variation of the light bar.
Figure 2:
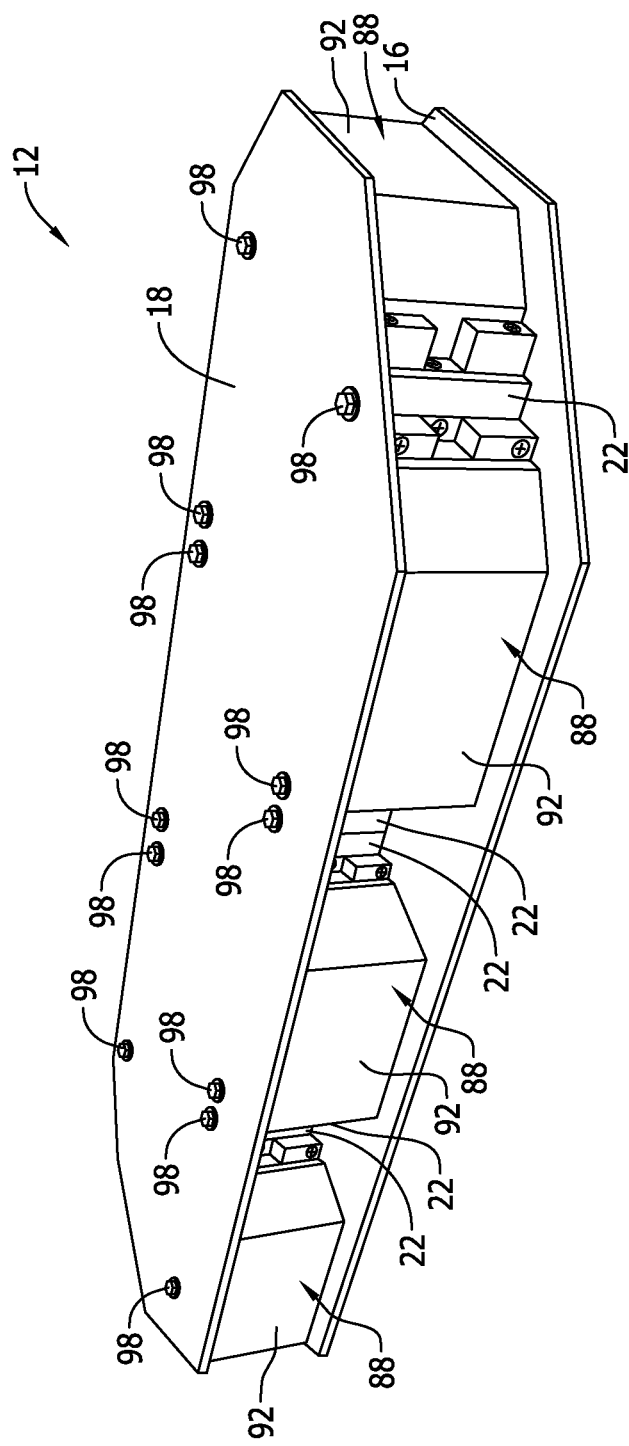
FIG. 2 is a representation of a right side perspective view of the light bar of FIG. 1.
Figure 3:
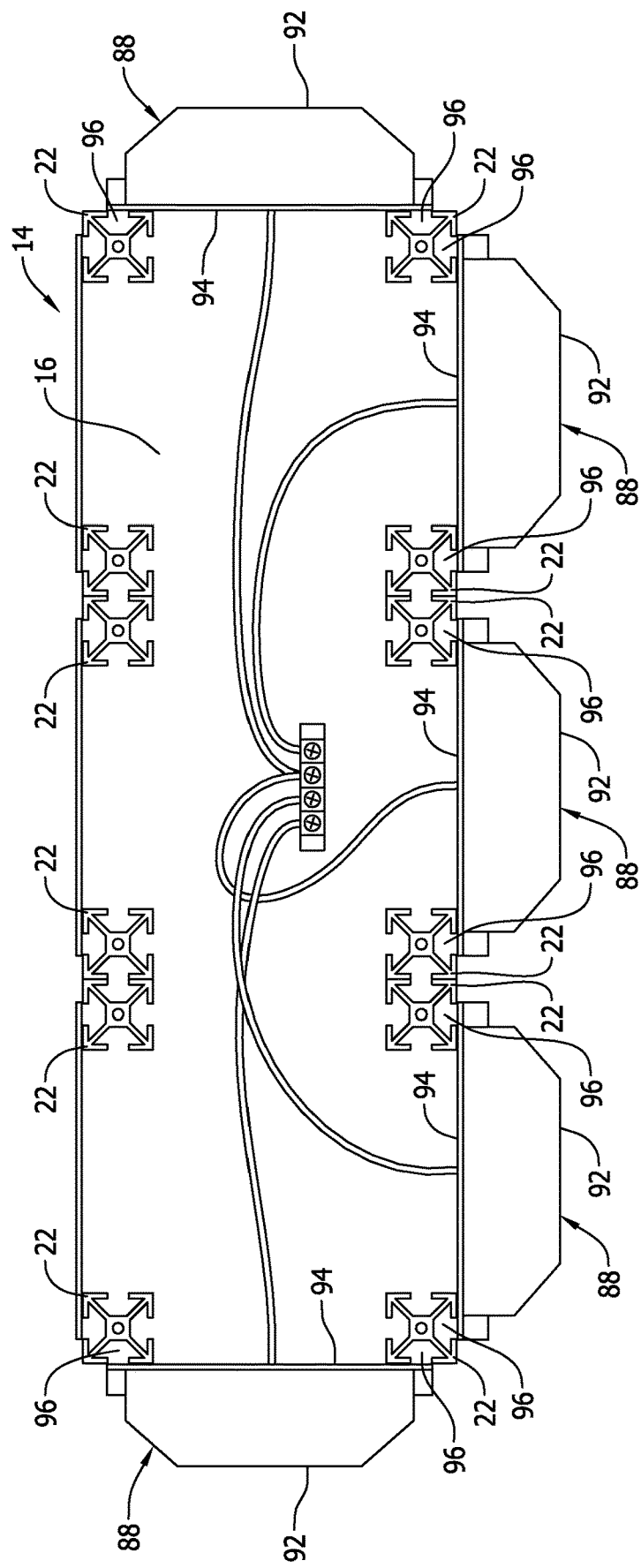
FIG. 3 is a representation of a top, plan view of the light bar of FIG. 1 with the top plate of the light bar removed, revealing the interior of the skeletal frame construction of the light bar.
Figure 4:
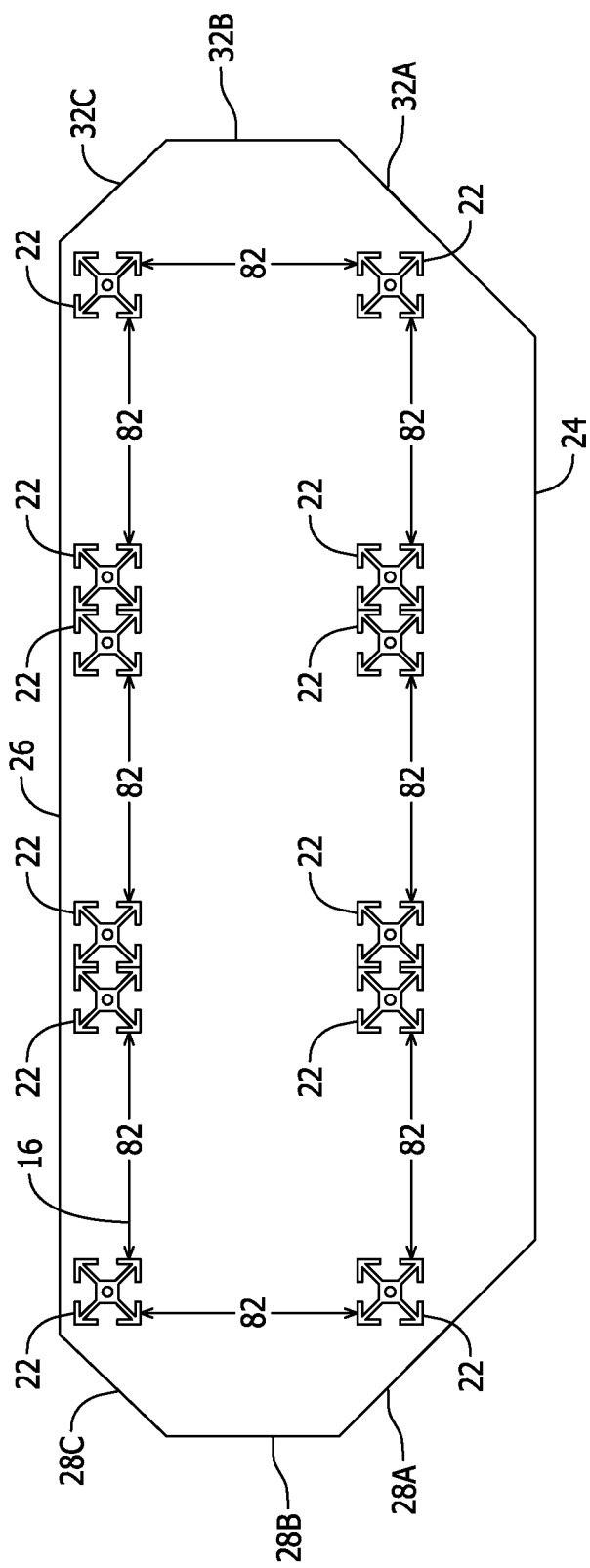
FIG. 4 is a representation of a plan view of a bottom plate of the light bar.

The light bar 12 for a vehicle of this disclosure is capable of various different configurations that enable the light bar 12 to expand volumetrically by constructing the light bar to any desired length, height, or depth. FIGS. 1-3 are representations of one possible construction configuration of the light bar 12. FIGS. 4-6 are representations of the component parts of the skeletal frame of the light bar 12 of FIGS. 1-3. The light bar 12 of FIGS. 1-3 and the skeletal frame of FIGS. 4-6 represent just one possible construction configuration of the light bar 12. As will be explained, the light bar of this disclosure can have a variety of different construction configurations to accommodate the mounting of a variety of different visual and audible warning devices, illumination devices, as well as a variety of auxiliary devices used on emergency vehicles and utility vehicles, as well as other types of vehicles.

The foundation of the construction of the light bar 12 is the skeletal frame 14 of the light bar that can easily expand volumetrically in length, width and height. FIGS. 4-5 represent the three basic component parts that go into the simplified construction of the skeletal frame 14 of the light bar 12.

The skeletal frame 14 is comprised of a bottom plate 16, a top plate 18 and a plurality of vertical support columns 22 that are assembled together to produce the skeletal frame 14 of the light bar 12. The basic component parts of the bottom plate 16, the top plate 18 and the plurality of vertical support columns 22 can be constructed of a variety of different materials such as metal, composite materials, plastic and other equivalent materials that have sufficient rigidity to provide the skeletal frame 14 with the structural strength required for the light bar 12.

The bottom plate 16 is a thin, rigid, flat plate having a peripheral edge that defines a peripheral configuration of the bottom plate. The peripheral edge of the bottom plate 16 is comprised of a straight, forward edge 24 and a straight, rearward edge 26 opposite the forward edge. The forward edge 24 and the rearward edge 26 are parallel. The peripheral configuration of the bottom plate 16 is also comprised of a left side edge having three straight sections 28A, 28B, 28C, and a right side edge having three straight sections 32A, 32B, 32C opposite the left side edge. The left side edge 28A, 28B, 28C and the right side edge 32A, 32B, 32C of the bottom plate 16 are mirror images of each other and have configurations that match configurations of forward lens surfaces of illumination devices and forward surfaces of other auxiliary devices that are assembled into the light bar 12, as will be explained.

The top plate 18 is also a thin, rigid flat plate having a peripheral edge that defines a peripheral configuration of the top plate. The peripheral edge of the top plate 18 is comprised of a straight, forward edge 36 and a straight, rearward edge 38 opposite the forward edge. The forward edge 36 and the rearward edge 38 are parallel. The peripheral configuration of the top plate 18 is also comprised of a left side edge having three, straight sections 42A, 42B, 42C and a right side edge having three, straight sections 44A, 44B, 44C opposite the left side edge. The left side edge 42A, 42B, 42C and the right side edge 44A, 44B, 44C of the top plate 18 are mirror images of each other and have configurations that match configurations of forward lens surfaces of illumination devices and forward surfaces of other auxiliary devices that are assembled into the light bar 12, as will be explained.

The peripheral configuration of the bottom plate 16 and the peripheral configuration of the top plate 18 are the same peripheral configuration. The bottom plate 16 and the top plate 18 have the same length dimensions and width dimensions. Additionally, when the bottom plate 16 and the top plate 18 are assembled into the skeletal frame 14 of the light bar 12, the forward edge 24 of the bottom plate 16 and the forward edge 36 of the top plate 18 are positioned in a same vertical plane, the rearward edge 26 of the bottom plate 16 and the rearward edge 38 of the top plate 18 are positioned in a same vertical plane, the left side edge sections 28A, 28B, 28C of the bottom plate 16 are positioned in same vertical planes as the left side edge sections 42A, 42B, 42C of the top plate 18, and the right side edge sections 32A, 32B, 32C of the bottom plate 16 and the right side edge sections 44A, 44B, 44C of the top plate 18 are positioned in same vertical planes.

Figure 7:
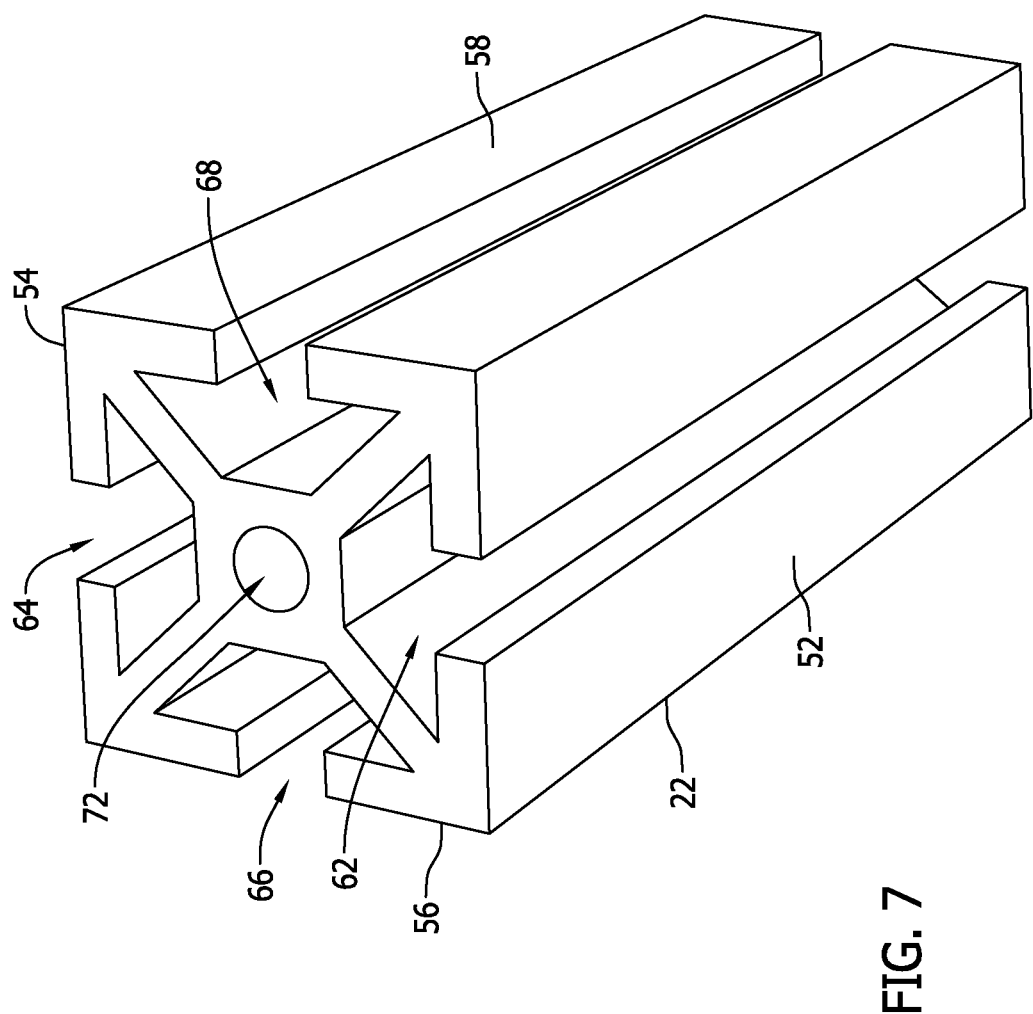
FIG. 7 is a representation of a top perspective view of a portion of a vertical support column.

The plurality of vertical support columns 22 are secured between the bottom plate 16 and the top plate 18. Each of the vertical support columns of the plurality of vertical support columns 22 has a same construction configuration. FIG. 7 is a representation of a top perspective view of a portion of one of the vertical support columns 22. As represented in FIG. 4, each of the vertical support columns 22 has a rectangular cross-section configuration, or a square cross-section configuration. Each of the vertical support columns 22 has a mounting surface or forward surface 52, a rearward surface 54 opposite the forward surface 52, a left side surface 56 and a right side surface 58 opposite the left side surface 56. Although the vertical support columns 22 are shown as having square cross-section configurations, they could have other equivalent cross-section configurations. There is a T-slot 62, 64, 66, 68 in each of the respective forward surface 52, rearward surface 54, left side surface 56, and right side surface 58. The T-slots have a same cross-section configuration. The T-slots extend the entire vertical height dimension of the plurality of vertical support columns 22. Each vertical support column 22 also has a fastener bore 72 extending through the center of the vertical support column.

Although the plurality of vertical support columns 22 are described as having T-slots 62, 64, 66, 68 as mounting means on the vertical support columns 22, the plurality of vertical support columns 22 could be constructed with other equivalent types of mounting means. For example, the plurality of vertical support columns 22 could have mounting slots having other configurations from the T-slots 62, 64, 66, 68 described above, or could have internally threaded holes, or other equivalent means for mounting devices to the plurality of vertical support columns 22.

Furthermore, although the skeletal frame 14 is described above as being comprised of a flat bottom plate 16 and a flat top plate 18, the bottom plate and top plate of the skeletal frame 14 could have various other configurations to adapt the skeletal frame 14 to the configuration of the surface of a vehicle to which the light bar 12 is to be attached. For example, the bottom plate and top plate of the skeletal frame could be constructed with angled configurations, curved configurations or various other equivalent configurations to adapt the skeletal frame and light bar to the configuration of the surface of a vehicle to which the light bar is to be attached.

Figure 8:
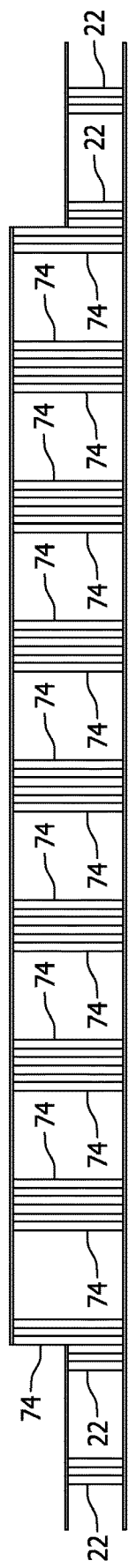
FIG. 8 is a representation of a front elevation view of a skeletal frame constructed of a plurality of first vertical support columns having a first vertical height dimension and a plurality of second vertical support columns having a second vertical height dimension.

The plurality of vertical support columns 22 is a plurality of first vertical support columns 22. The plurality of first vertical support columns 22 each have a first vertical height dimension. As will be explained, the various configurations of the light bar of this disclosure could be constructed with a plurality of second vertical support columns 74 that each have a second vertical height dimension that is twice the vertical height dimension as the first vertical height dimension of the plurality of first vertical support columns 22. As an example, FIG. 8 is a front elevation view of a skeletal frame constructed of a plurality of first vertical support columns 22 and a plurality of second vertical support columns 74. Different configurations of the light bar of this disclosure could also be constructed with a plurality of third vertical support columns, where each third vertical support column has a third vertical height dimension that is three times the first vertical height dimension of the plurality of first vertical support columns 22. Each of the vertical support columns of the plurality of first vertical support columns 22, the plurality of second vertical support columns 74, and the plurality of third vertical support columns have a same cross-section configuration of the vertical support column such as that represented in FIG. 7 that enable the plurality of vertical support columns to be substituted for each other in constructing a skeletal frame for the various different construction configurations of the light bar of this disclosure.

FIGS. 4-6 are representations of the bottom plate 16, the top plate 18 and the plurality of first vertical support columns 22 assembled together to form the rigid skeletal framework 14 of the light bar 12. In assembling the framework 14, the plurality of first vertical support columns 22 are positioned over fastener holes (not shown) through the bottom plate 16. The pattern of fastener holes through the bottom plate 16 is the same pattern of fastener holes 78 through the top plate 18 represented in FIG. 5. Threaded fasteners are inserted through the fastener holes of the bottom plate 18 and into the fastener bores 72 of the plurality of first vertical support columns 22 positioned on the bottom plate 16. The fasteners (not shown) are tightened down to secure the plurality of first vertical support columns 22 to the bottom plate 16 with the plurality of first vertical support columns 22 engaging against the bottom plate 16 in perpendicular orientations relative to the bottom plate. The plurality of first vertical support columns 22 are secured to the bottom plate 16 with the forward surfaces 52 of the plurality of first vertical support columns 22 being directed toward and parallel to the forward edge of the bottom plate 24. As represented in FIG. 4, with the plurality of first vertical support columns 22 secured to the bottom plate 16, there is a same first distance dimension 82 between adjacent first vertical support columns 22 of the plurality of first vertical support columns 22.

With the plurality of first vertical support columns 22 secured to the bottom plate 16, a plurality of illumination devices 88 are assembled to the skeletal frame 14 of the light bar 12. The assembly of the plurality of illumination devices to the skeletal frame 14 is represented in FIG. 3. The plurality of illumination devices 88 each include a forward lens surface 92 that is configured for projecting illumination and a rearward mounting surface 94 opposite the forward lens surface 92. The rearward mounting surface 94 has at least two fasteners 96, for example T-fasteners 96 projecting from the rearward mounting surface 94. The T-fasteners 96 are positioned a distance apart on the rearward mounting surface where the fasteners 96 can be received in sliding engagement in the T-slots 62 of two adjacent first vertical support columns 22 in mounting the illumination device 88 to the two adjacent vertical support columns 22.

Figure 17:
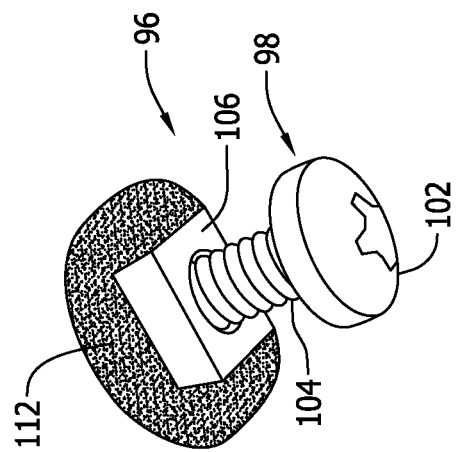
FIG. 17 is a representation of a perspective view of a specialized fastener assembly employed with the vertical support columns of the light bar.
Figure 17:
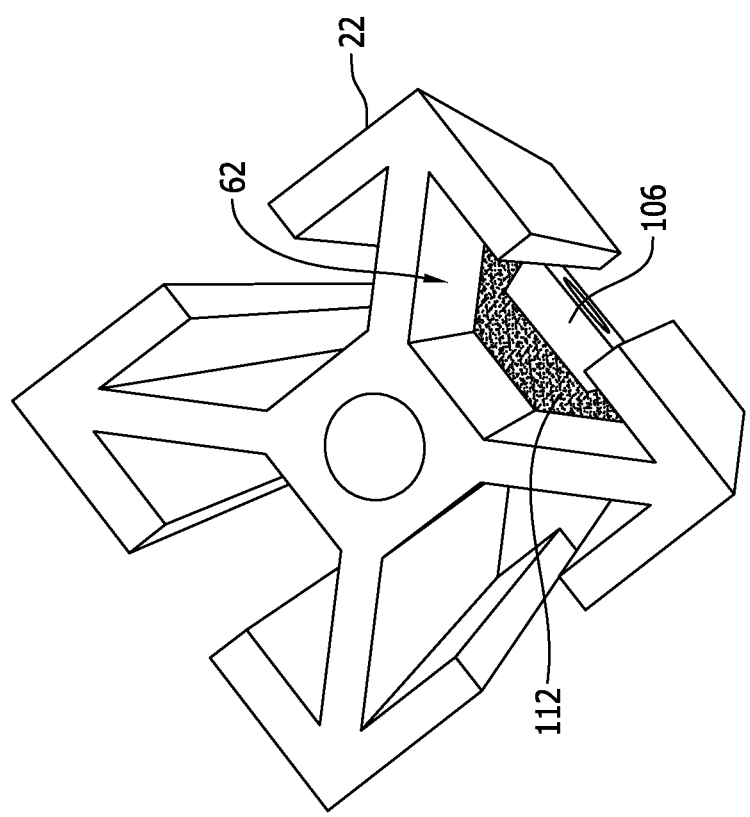
Figure 18:
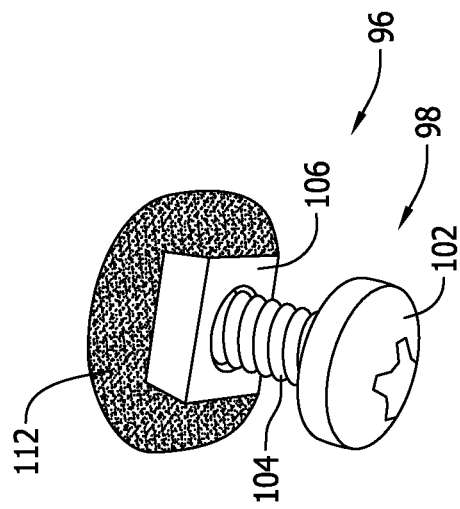
FIG. 18 is a representation of a perspective view, similar to that of FIG. 17, of the specialized fastener assembly employed with the vertical support columns of the light bar.
Figure 18:
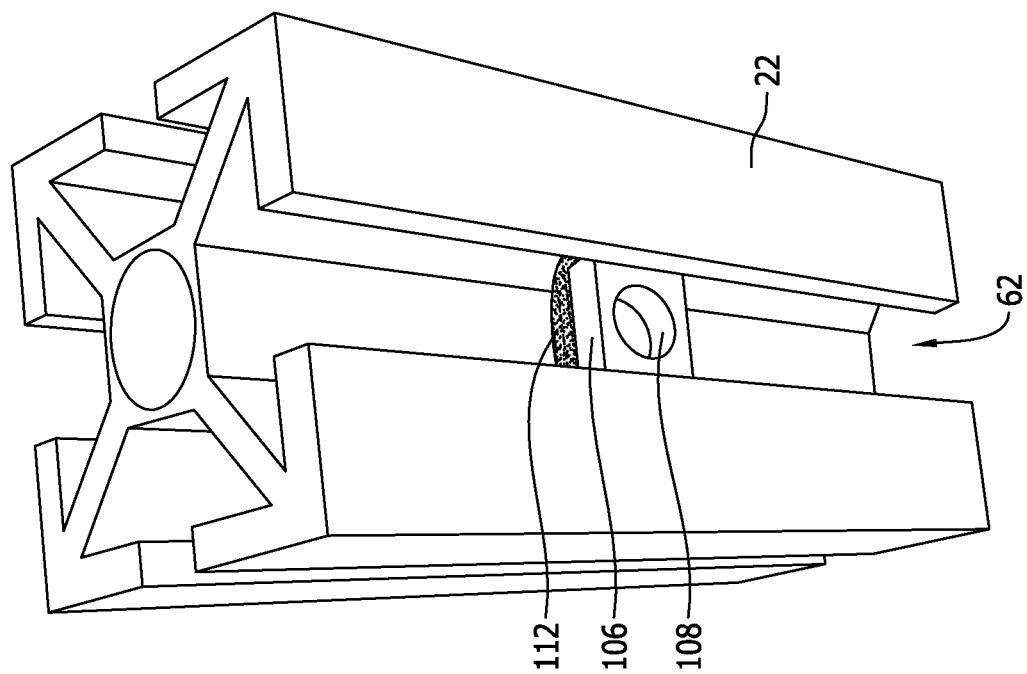
Figure 19:
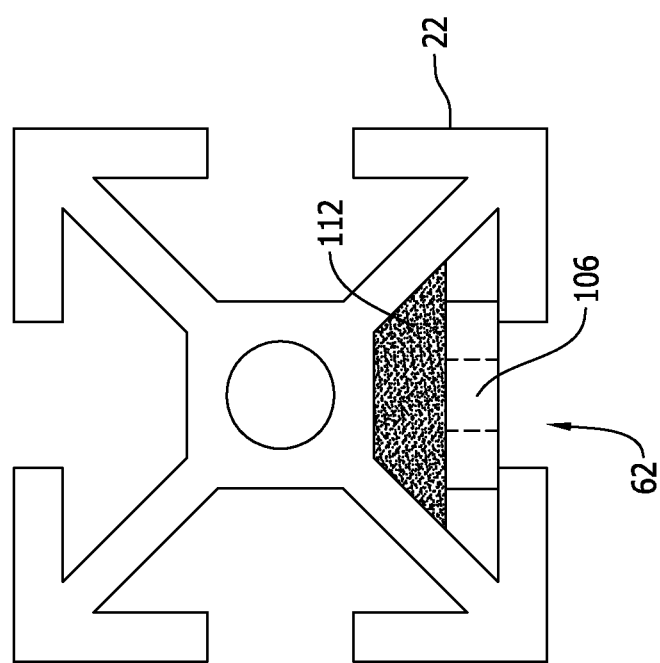
FIG. 19 is a representation of a plan view of a vertical support column with a nut of the specialized fastener assembly installed in the vertical support column.

FIG. 17 is an enlarged, perspective view of one of the fasteners 96 of the light bar 12. As represented in FIG. 17, the fastener 96 is comprised of a screw 98 having a head 102 and a screw threaded shaft 104, a nut 106 having an internally threaded through bore 108, and a pad 112 secured to the nut 106. The pad 112 is constructed of a resilient, compressible material such as foam rubber, sponge rubber, cellular rubber or another equivalent type of material. As represented in FIGS. 17-19, the nut 106 is dimensioned to be received in sliding engagement in the T-slots 62 of the vertical support columns 22 without passing through the front opening of the T-slot. The pad 112 is dimensioned to compress as the nut 106 is inserted into the T-slot 62. For example, with the screw 98 screw threaded into the nut 106 as represented in FIG. 17, the nut 106 can be passed into the top opening of the T-slot 62 of the support column 22 and moved downwardly through the T-slot. As the nut 106 is inserted into the top of the T-slot 62, the pad 112 is compressed by the T-slot 62. Thus, the nut 106 with the attached screw 98 can be manually inserted through the top of the T-slot 62 and manually moved through the T-slot, and when manual movement of the nut 106 and attached screw 98 is ceased, the compressed pad 112 will hold the nut 106 and the attached screw 98 in their vertical positions relative to the vertical support column 22 as represented in FIGS. 17 and 18.

With at least two fasteners 98 loosely attached in at least two fastener holes through opposite ends of an illumination device 88, the specialized construction of each fastener 96 comprising the screw 98, the nut 106 and the pad 112 enables the illumination device 88 to be assembled between a pair of adjacent vertical support columns 22 by manually inserting the nut 106 and the pad 112 of the at least two fasteners 96 on the illumination device 88 into and downwardly through the T-slots 62 of two adjacent vertical support columns 22. As the nut 106 and the pad 112 of the at least two fasteners 96 on the illumination device 88 are inserted into the T-slots 62 of the two adjacent vertical support columns 22, the pad 112 of each fastener 96 compresses. The illumination device 88 can be manually moved through the T-slots 62 of the two adjacent vertical support columns 22 to a desired vertical position of the illumination device 88 relative to the two adjacent vertical support columns. Upon manually releasing the illumination device 88, the resilience of the compressed pads 112 of the fasteners 96 on the illumination device 88 will hold the illumination device at its vertical position relative to the two vertical support columns 22.

Furthermore, after the light bar 12 has been assembled, the illumination device 88 can be removed from the two adjacent vertical support columns 22 by removing the screws 98 of the fasteners 96 on the illumination device 88. Removing the screws 98 from their associated nuts 106 will enable the illumination device 88 to be removed from the front mounting surfaces of the vertical support columns 22. Furthermore, with the illumination device 88 removed from the adjacent vertical support columns 22, the resilient pads 112 of the nuts 106 will hold the nuts in their vertical positions relative to the two adjacent vertical support columns 22. This enables the illumination device 88 to be removed from the two adjacent vertical support columns 22 for repair of the illumination device 88, or replacement of the illumination device with another illumination device 88 by aligning fastener holes of the other illumination device with the nuts 106 held in their vertical positions in the T-slot 66 of the two adjacent vertical support columns 22 by their associated resilient pads 112. Screws 98 can then be inserted through the fastener holes of the illumination device 88 and into the nuts 106 held at their vertical positions in the T-slots 62 of the two adjacent vertical support columns 22 by their associated resilient pads 112. Screwing the screws 98 into the nuts 106 attaches or mounts the other illumination device 88 to the two adjacent vertical support columns 22. Thus, it is not necessary to disassemble the entire light bar 12 to service one of the illumination devices 88 or to replace one of the illumination devices 88 with another type of illumination device. Each of the illumination devices 88 of the light bar 12 can be removed from the light bar as discussed above without the need to disassemble other portions of the light bar. As represented in FIG. 3, in one example of the light bar 12 there are five illumination devices 88 mounted to five pairs of adjacent first vertical support columns 22. Each of the illumination devices 88 has a length dimension that spans across the first distance dimension 82 between adjacent pairs of the first vertical support columns 22. In addition, each of the illumination devices 88 has a height dimension that is substantially equal to the first vertical height dimension of the first vertical support columns 22. This enables the illumination devices 88 to occupy the entire open area between adjacent pairs of first vertical support columns 22. The plurality of illumination devices 88 is comprised of illumination devices that project flashing signal lights when operated, that project illuminating beacons when operated, and other equivalent types of illumination devices. The forward edge of the bottom plate 24 and the forward edge of the top plate 36 project slightly in front of the forward lens surfaces 92 of the illumination devices 88 mounted along the forward edge of the bottom plate 24 and the forward edge of the top plate 36, and thereby protect the forward lens surfaces 92. Additionally, the left side edge sections 28A, 28B, 28C of the bottom plate and the left side edge sections 42A, 42B, 42C of the top plate, and the right side edge sections 32A, 32B, 32C of the bottom plate and the right side edge sections 44A, 44B, 44C of the top plate project slightly beyond the forward lens surfaces 92 of the illumination devices 88 mounted between these edges and thereby protect the forward lens surfaces.

In addition to illumination devices 88, other auxiliary devices could be mounted between adjacent first vertical support columns 22 of the plurality of first vertical support columns 22 in the same manner as the illumination device 88 described above. For example, video devices having at least two fasteners projecting from rearward mounting surfaces of the video devices could be mounted between adjacent first vertical support columns 22 of the plurality of first vertical support columns. Audio devices having at least two fasteners projecting from rearward mounting surfaces of the audio devices could be mounted between adjacent first vertical support columns 22 of the plurality of first vertical support columns 22. The construction of the light bar 12 is not limited to having only illumination devices mounted between adjacent first vertical support columns 22. A variety of other devices similar in construction to the illumination devices 88 could be mounted between adjacent first vertical support columns 22 of the light bar 12. For example, the illumination devices could have forward lens surfaces and one or more side lens surfaces, forward lens surfaces and rearward lens surfaces, lens surfaces positioned completely around the illumination device, or other equivalent combinations of lens surfaces. The common feature of all of the different types of devices that could be mounted between adjacent first vertical support columns 22 in constructing the light bar 12 is that all of the devices are self-contained and sealed devices, eliminating the need for the light bar 12 itself to be sealed. In addition to the illumination devices and other auxiliary devices being mounted between two adjacent support columns 22, the devices could also be mounted directly on the top plate 18.

With the plurality of illumination devices 88 mounted between adjacent first vertical support columns 22 of the plurality of first vertical support columns 22, the top plate 18 is positioned on the tops of the plurality of first vertical support columns 22 secured to the bottom plate 16. The fastener holes 78 through the top plate 18 are aligned with the fastener bores 72 of the plurality of first vertical support columns 22. Fasteners 114 are then inserted through the fastener holes 78 of the top plate 18 and into the fastener bores 78 of the plurality of first vertical support columns 22 as represented in FIGS. 1 and 2. The fasteners 114 are then tightened down, securing the top plate 18 to the plurality of first vertical support columns 22, and thereby securing the top plate 18 to the bottom plate 16. This completes the assembly of a first configuration of the light bar 12 represented in FIGS. 1 and 2.

Figure 9:
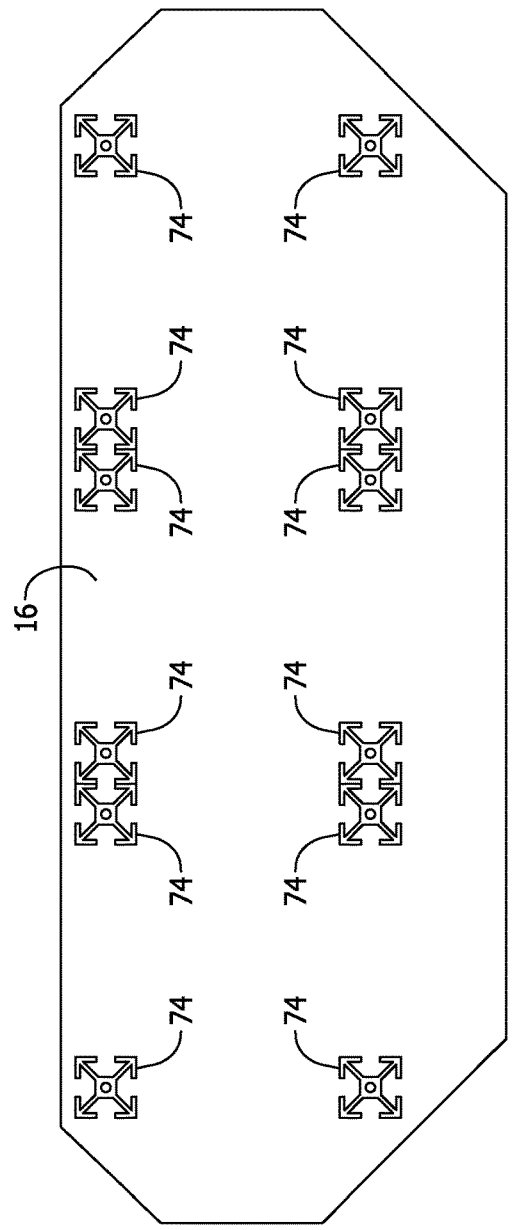
FIG. 9 is a representation of a plan view of a bottom plate of the skeletal frame of the light bar that is similar to that of FIG. 4.
Figure 10:
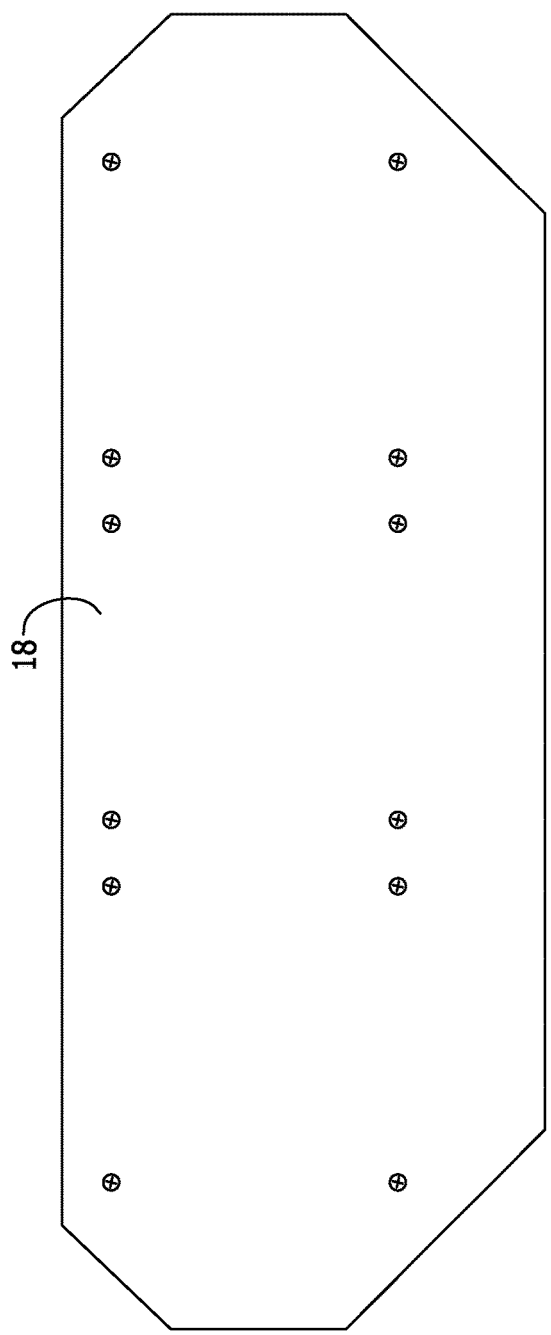
FIG. 10 is a representation of a plan view of a top plate of the skeletal frame of the light bar that is similar to that of FIG. 5.
Figure 11:
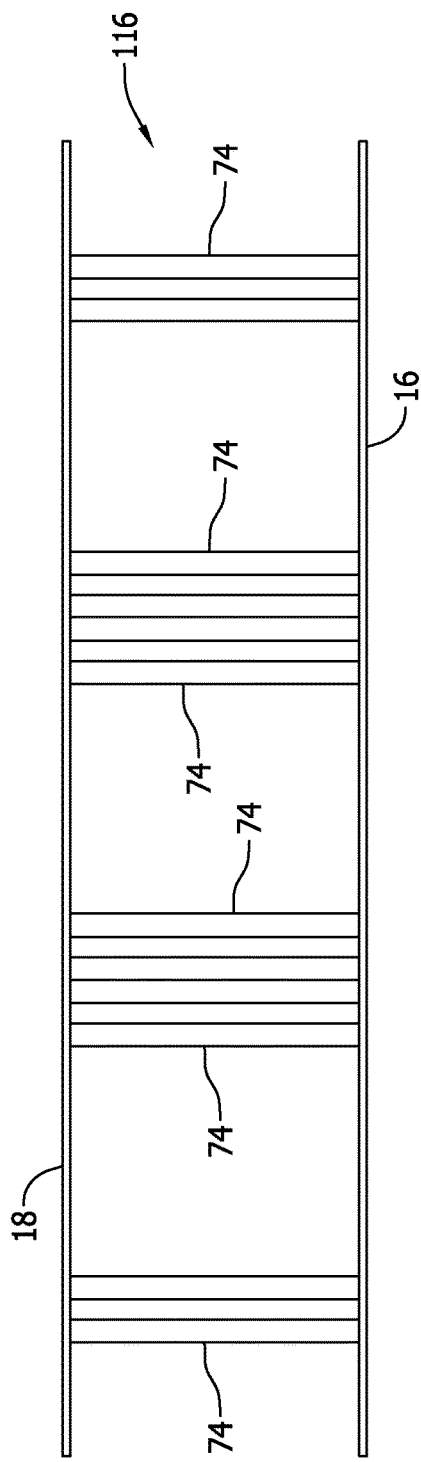
FIG. 11 is a front elevation view of a skeletal frame constructed of the bottom plate of FIG. 9 and the top plate of FIG. 10 and a plurality of second vertical support columns having a height dimension that is twice the height dimension of the plurality of first vertical support columns represented in FIG. 6.

FIGS. 9-11 represent a construction of a skeletal frame 116 that is similar in construction to the skeletal frame 14 of FIGS. 4-6. However, in the skeletal frame 116 of FIGS. 9-11, the plurality of first vertical support columns 22 of the skeletal frame 14 of FIGS. 4-6 have been replaced by the plurality of second vertical support columns 74. The skeletal frame 116 of FIGS. 9-11 is comprised of the bottom plate 16 and top plate 18 of the skeletal frame 14 of FIGS. 4-6. However, in the skeletal frame 116 of FIGS. 9-11, the plurality of first vertical support columns 22 secured between the bottom plate 16 and the top plate 18 are removable from between the bottom plate 16 and the top plate 18 and are replaceable with the plurality of second vertical support columns 74 secured between the bottom plate 16 and the top plate 18. Replacing the plurality of first vertical support columns 22 with the plurality of second vertical support columns 74 gives the skeletal frame 116 a length dimension of the bottom plate 16 and the top plate 18, a width dimension of the bottom plate 16 and the top plate 18, and a vertical height dimension of the plurality of second vertical support columns 74. Constructing the skeletal frame 116 of the light bar by replacing the plurality of first vertical support columns 22 with the plurality of second vertical support columns 74 adjusts the height dimension of the skeletal frame 116 upwardly to the second vertical height dimension of the plurality of second vertical support columns 74. Constructing the skeletal frame 14 of the light bar with the bottom plate 16, the top plate 18, and replacing the plurality of second vertical support columns 74 with the plurality of first vertical support columns 22 adjusts the vertical height dimension of the skeletal frame 116 downwardly to the first vertical height dimension of the plurality of first vertical support columns 22. In this manner, the volume of the skeletal frame of the light bar can be expanded upwardly in height, or retracted downwardly in height, respectively.

Figure 12:
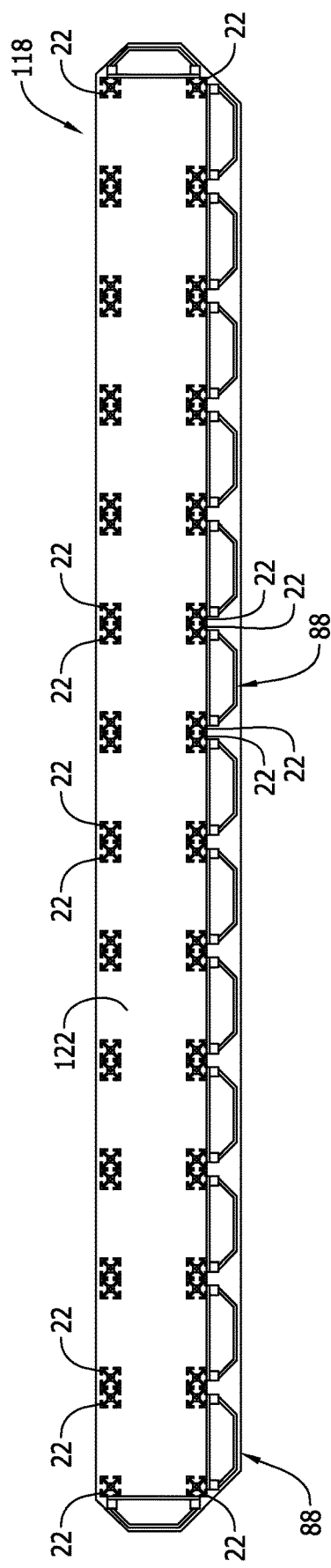
FIG. 12 is a representation of a bottom plate of a skeletal frame of the light bar having a larger length than the light bar represented in FIG. 4.
Figure 13:
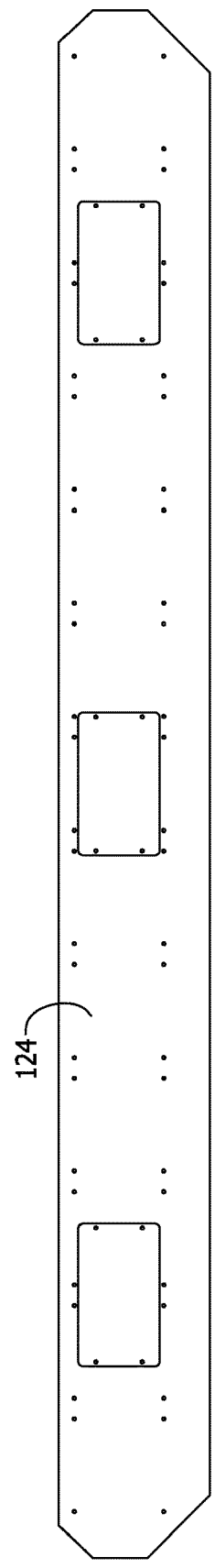
FIG. 13 is a representation of a top plate of the skeletal frame of a light bar that has a larger length dimension than the light bar of FIG. 5.
Figure 14:
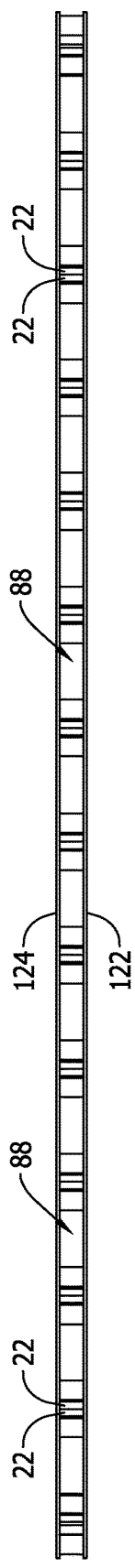
FIG. 14 is a representation of a front elevation view of a skeletal frame of a light bar constructed of the bottom plate of FIG. 12, the top plate of FIG. 13, and a plurality of first vertical support columns having first vertical height dimensions.
Figure 15A:
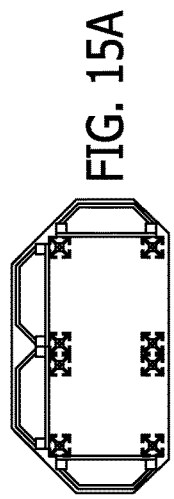
Figure 15B:
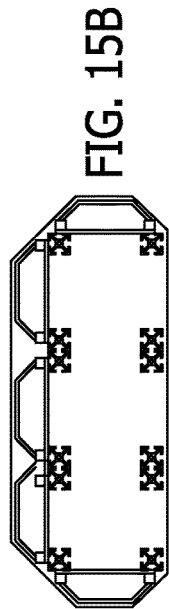
Figure 15C:
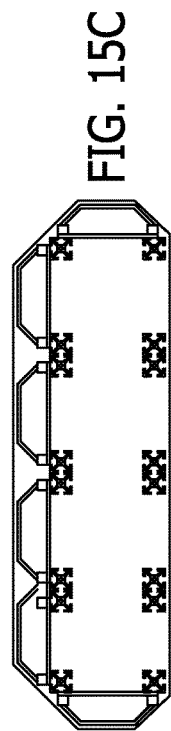
Figure 15D:
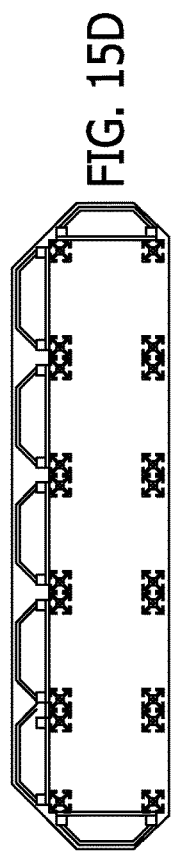
Figure 15E:
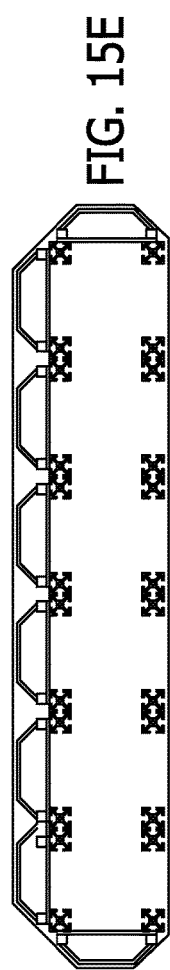
Figure 15F:
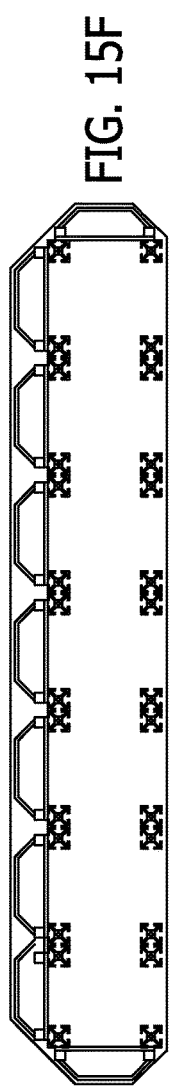

As represented in FIGS. 12-14, in addition to the skeletal frame 14 of the light bar 12 being constructed with the first bottom plate 16 having the first peripheral configuration, the first top plate 18 having the first peripheral configuration and the first plurality of vertical support columns 22 having the first vertical height dimension, a further skeletal frame 118 could be constructed with a second bottom plate 122 having a second peripheral configuration and a second top plate 124 having a second peripheral configuration, where the second peripheral configurations of the second bottom plate 122 and the second top plate 124 are the same peripheral configurations, and the second peripheral configurations of the second bottom plate 122 and the second top plate 124 are different from the first peripheral configurations of the first bottom plate 16 and the first top plate 18. For example, the second peripheral configurations of the second bottom plate 122 and the second top plate 124 have a larger length dimension and/or a larger width dimension than the first peripheral configurations of the first bottom plate 16 and the first top plate 18. In the example shown in FIGS. 12-14 the second bottom plate 122 and the second top plate 124 have larger length dimensions than the first bottom plate 16 and the first top plate 18. A plurality of the first vertical support columns 22 could be used in securing the second bottom plate 122 to the second top plate 124 in constructing the skeletal frame 118 of FIGS. 12-14. Alternatively, the plurality of second vertical support columns 74 could be used in securing the second bottom plate 122 to the second top plate 124. In this manner, the volume of the second skeletal frame 118 of the light bar can be adjusted by increasing the length dimension of the second bottom plate 122 and the length dimension of the second top plate 124 of the light bar and/or increasing the width dimension of the second bottom plate 122 and the second top plate 124 of the light bar.

FIGS. 15A-15L are representations of various different light bar construction configurations that illustrate the ability of the skeletal frames of the light bar configurations to have adjusted length dimensions.

Figure 16:
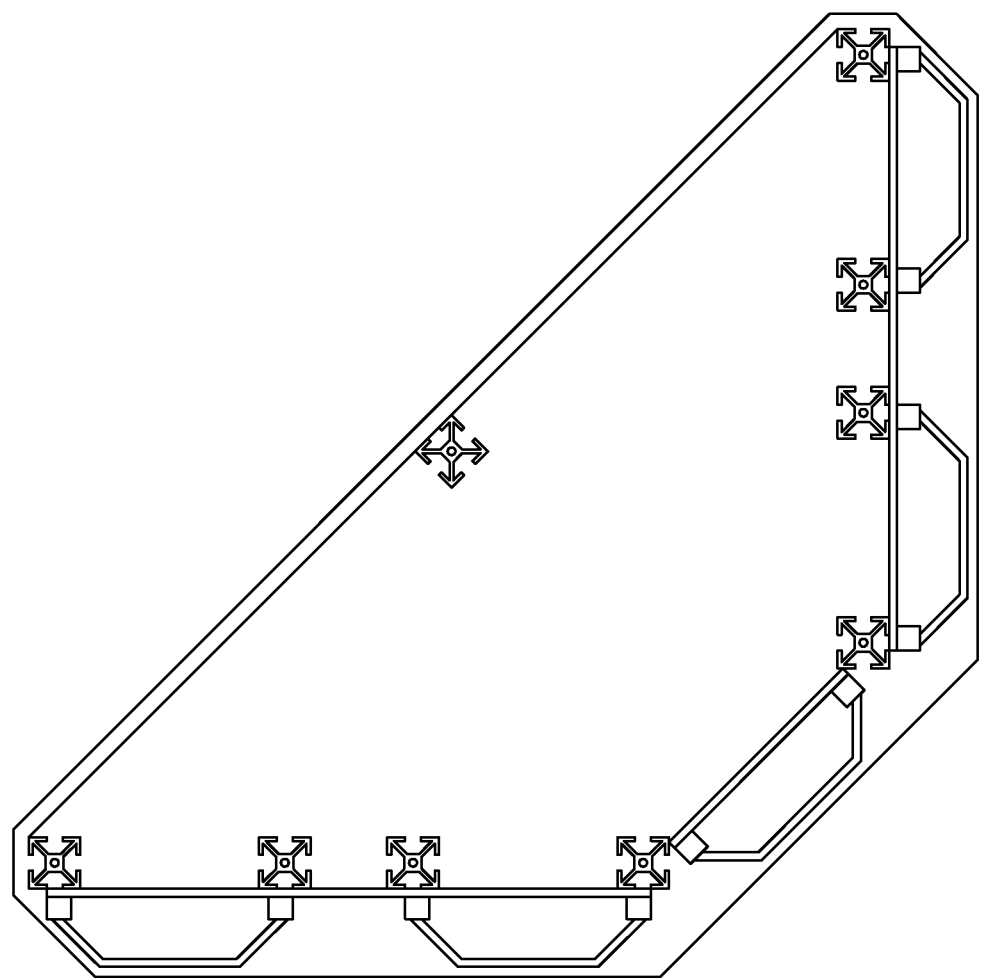
FIG. 16 is a representation of a plan view of a light bar constructed with a skeletal frame having a general triangular configuration.

FIG. 16 is a representation of a light bar having a skeletal frame with a general triangular configuration.

The light bar skeletal frame configurations of FIGS. 15A-15L and FIG. 16 further represent the ability of the light bar of this disclosure to adjust volumetrically.

In the manner discussed above, the light bar for a vehicle of this disclosure can be easily adjusted volumetrically, in length, width and height, to mount a variety of different illumination devices, visual devices, video devices, audible warning devices, as well as a variety of auxiliary devices on the light bar. The skeletal frame volumetric expansion does not require complex or expensive tooling, and can be made to any desired length, height, or width, without sacrificing the strength of the skeletal frame.

As various modifications could be made in the light bar structure and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A light bar for a vehicle, the light bar comprising:
a bottom plate, the bottom plate having a forward edge and a rearward edge opposite the forward edge, the bottom plate having a left side edge and a right side edge opposite the left side edge;
a top plate, the top plate having a forward edge and a rearward edge opposite the forward edge, the top plate having a left side edge and a right side edge opposite the left side edge, the forward edge of the top plate and the forward edge of the bottom plate being parallel and positioned in a vertical plane;
a plurality of vertical support columns secured between the bottom plate and the top plate, the plurality of vertical support columns securing the bottom plate to the top plate, each vertical support column of the plurality of vertical support columns having a forward surface that is directed toward the forward edge of the bottom plate and is directed toward the forward edge of the top plate, each vertical support column of the plurality of vertical support columns having a slot in the forward surface of the vertical support column, the slot extending an entire vertical dimension of the vertical support column; and,
a plurality of illumination devices, each illumination device having a forward lens surface configured for projecting illumination and a rearward mounting surface opposite the forward lens surface, and the rearward mounting surface having two fasteners projecting from the rearward mounting surface and received in engagement in the slot of two adjacent vertical support columns of the plurality of vertical support columns in mounting the illumination device to the two adjacent vertical support columns.

2. A light bar for a vehicle, the light bar comprising:
a bottom plate, the bottom plate having a forward edge and a rearward edge opposite the forward edge, the bottom plate having a left side edge and, a right side edge opposite the left side edge;
a top plate, the top plate having a forward edge and a rearward edge opposite the forward edge, the top plate having a left side edge and a right side edge opposite the left side edge, the forward edge of the top plate and the forward edge of the bottom plate being parallel and positioned in a vertical plane;
a plurality of vertical support columns secured between the bottom plate and the top, plate, the plurality of vertical support columns securing the bottom plate to the top plate, each vertical support, column of the plurality of vertical support columns having a forward surface that is directed toward the forward edge of the bottom plate and is directed toward the forward edge of the top plate, each vertical support column of the plurality of vertical support columns having a slot in the forward surface of the vertical support column;
a plurality of illumination devices, each illumination device having a forward lens surface configured for projecting illumination and a rearward mounting surface opposite the forward lens surface, and the rearward mounting surface having two fasteners projecting from the rearward mounting surface, and received in engagement in the slot of two adjacent vertical support columns of the plurality of vertical support columns in mounting the illumination device to the two adjacent vertical support columns;
the slot being a T-slot; and;
the fasteners being T-fasteners.

3. The light bar of claim 2, further comprising:
the illumination device mounted to the two adjacent vertical support columns being a lower illumination device; and,
an upper illumination device, the upper illumination device having a forward lens surface configured for projecting illumination and a rearward mounting surface opposite the forward lens surface, the rearward mounting surface having two T-fasteners projecting from the rearward mounting surface and received in sliding engagement in the T-slots of the two adjacent vertical support columns of the plurality of vertical support columns in mounting the upper illumination device to the two adjacent vertical support columns above the lower illumination device.

4. The light bar of claim 2, further comprising:
the plurality of vertical support columns being a plurality of first vertical support columns secured between the bottom plate and the top plate, each first vertical support column of the plurality of first vertical support columns having a first vertical height dimension;
a plurality of second vertical support columns, each second vertical support column of the plurality of second vertical support columns having a second vertical height dimension, the second vertical height dimension being larger than the first vertical height dimension; and,
the plurality of first vertical support columns secured between the bottom plate and the top plate are removable from between the bottom plate and the top plate and are replaceable with the plurality of second vertical support columns secured between the bottom plate and the top plate.

5. The light bar of claim 4, further comprising:
the second vertical height dimension being twice the first vertical height dimension.

6. The light bar of claim 2, further comprising:
a plurality of pairs of adjacent vertical support columns of the plurality of vertical support columns, the plurality of pairs of vertical support columns being arranged in a straight line between the bottom plate and the top plate, the straight line being parallel to the forward edge of the bottom plate and the forward edge of the top plate; and,
an illumination device of the plurality of illumination devices being mounted to each pair of adjacent vertical support columns of the plurality of pairs of adjacent vertical support columns.

7. The light bar of claim 2, further comprising:
at least a pair of the plurality of vertical support columns positioned in a line parallel to the left side edge of the bottom plate and parallel to the left side edge of the top plate;
at least a pair of the plurality of vertical support columns positioned in a line parallel to the right side edge of the bottom plate and parallel to the right side edge of the top plate;
an illumination device of the plurality of illumination devices mounted to the pair of vertical support columns positioned in the line parallel to the left side edge of the bottom plate and parallel to the right side edge of the top plate; and, an illumination device of the plurality of illumination devices mounted to the pair of vertical support columns positioned in the line parallel to the right side edge of the bottom plate and parallel to the right side edge of the top plate.

8. The light bar of claim 2, further comprising:
the bottom plate having a plurality of holes through the bottom plate;
the top plate having a plurality of holes through the top plate, the plurality of holes through the top plate being vertically aligned with and coaxial with the plurality of holes through the bottom plate; and,
each vertical support column of the plurality of vertical support columns being vertically aligned with a hole through the bottom plate of the plurality of holes through the bottom plate and a hole through the top plate of the plurality of holes through the top plate;
a plurality of fasteners extending through the plurality of holes through the bottom plate and into the plurality of vertical support columns, the plurality of fasteners extending through the plurality of holes through the bottom plate and into the plurality of vertical support columns removably attaching the plurality of vertical support columns to the bottom plate; and,
a plurality of fasteners extending through the plurality of holes through the top plate and into the plurality of vertical support columns, the plurality of fasteners extending through the plurality of holes through the top plate and into the plurality of vertical support columns removably attaching the plurality of vertical support columns to the top plate.

9. The light bar of claim 2, further comprising:
the forward edge of the bottom plate, the rearward edge of the bottom plate, the left side edge of the bottom plate, and the right side edge of the bottom plate together define a peripheral configuration of the bottom plate;
the forward edge of the top plate, the rearward edge of the top plate, the left side edge of the top plate and the right side edge of the top plate together define a peripheral configuration of the top plate; and,
the peripheral configuration of the top plate is a same configuration as the peripheral configuration of the bottom plate.

10. The light bar of claim 2, further comprising:
the forward edge of the bottom plate, the rearward edge of the bottom plate, the left side edge of the bottom plate and the right side edge of the bottom plate together define a peripheral configuration of the bottom plate;
the forward edge of the top plate, the rearward edge of the top plate, the left side edge of the top plate and the right side edge of the top plate together define a peripheral configuration of the top plate; and,
the peripheral configuration of the top plate is a different configuration from the peripheral configuration of the bottom plate.

11. The light bar of claim 2, further comprising:
the plurality of illumination devices being mountable directly to the bottom plate and the top plate.

12. The light bar of claim 2, further comprising:
the bottom plate having an access port; and,
the top plate having an access port.

13. A light bar for a vehicle, the light bar comprising:
a bottom plate, the bottom plate having a peripheral edge that defines a peripheral configuration of the bottom plate;
a top plate, the top plate having a peripheral edge that defines a peripheral configuration of the top plate;
a plurality of first vertical support columns secured between the bottom plate and the top plate, the plurality of first vertical support columns securing the bottom plate to the top plate;
each first vertical support column of the plurality of first vertical support columns having a first vertical height dimension, each first vertical support: column of the plurality of first vertical support columns having a forward surface and a slot in the forward surface, the slot being a T-slot;
a plurality of illumination devices, each illumination device having a forward lens surface configured for projecting illumination and a rearward mounting surface opposite the forward lens surface, the rearward mounting surface of each illumination device having T-fasteners projecting from the rearward mounting surface and received in engagement in the T-slots of two adjacent first vertical support columns of the plurality of first vertical support columns, the T-fasteners removably attach the illumination device to the two adjacent first vertical support columns of the plurality of first vertical support columns;
a plurality of second vertical support columns, each second vertical support column of the plurality of second vertical support columns having a second vertical height dimension, the second vertical height dimension being larger than the first vertical height dimension; and,
the plurality of first vertical support columns secured between the bottom plate and the top plate are removable from between the bottom plate and the top plate and are replaceable with the plurality of second vertical support columns secured between the bottom plate and the top plate.

14. The light bar of claim 13, further comprising:
the second vertical height dimension being at least twice the first vertical height dimension.

15. The light bar of claim 13, further comprising:
the plurality of illumination devices comprising a plurality of lower illumination devices and a plurality of upper illumination devices; and,
with the plurality of first vertical support columns secured between the bottom plate and the top plate being replaced by the plurality of second vertical support columns secured between the bottom plate and the top plate, a lower illumination device of the plurality of lower illumination devices removably attached to two adjacent second vertical support columns of the plurality of second vertical support columns; and,
an upper illumination device of the plurality of upper illumination devices removably attached to the two adjacent second vertical support columns of the plurality of second vertical support columns above the lower illumination device removably attached to the two adjacent second vertical support columns.

16. The light bar of claim 13, further comprising:
the bottom plate peripheral edge including a forward edge of the bottom plate;
the top plate peripheral edge including a forward edge of the top plate;
the plurality of first vertical support columns including a plurality of pairs of adjacent first vertical support columns arranged in a straight line between the bottom plate and top plate, the straight line being parallel to the forward edge of the bottom plate and the forward edge of the top plate; and, an illumination device of the plurality of illumination devices mounted to each pair of the plurality of pairs of adjacent first vertical support columns.

17. The light bar of claim 16, further comprising:
the plurality of pairs of adjacent first vertical support columns including a pair of first vertical support columns that are positioned along a line that is oriented at an angle relative to the straight line; and,
the plurality of illumination devices including an illumination device removably attached to the pair of adjacent first vertical support columns that are positioned along the line oriented at an angle to the straight line.

18. The light bar of claim 13, further comprising:
the plurality of illumination devices comprising a plurality of lower illumination devices and a plurality of upper illumination devices;
each second vertical support column of the plurality of second vertical support columns having a forward surface, each second vertical support column of the plurality of second vertical support columns having a T-slot in the forward surface of the second vertical support column;
the T-fasteners projecting from the rearward mounting surface of each lower illumination device being received in sliding engagement in the T-slots of the two adjacent first vertical support columns of the plurality of first vertical support columns in mounting the lower illumination device to the two adjacent first vertical support columns; and,
the T-fasteners projecting from the rearward mounting surface of each upper illumination device being received in sliding engagement in the T-slots of two adjacent second vertical support columns of the plurality of second vertical support columns in mounting the illumination device to the two adjacent second vertical support columns.

19. The light bar of claim 13, further comprising:
the bottom plate having a plurality of holes through the bottom plate;
the top plate having a plurality of holes through the top plate, the plurality of holes through the top plate being vertically aligned with and coaxial with the plurality of holes through the bottom plate; and,
each first vertical support column of the plurality of first vertical support columns and each second vertical support column of the plurality of second vertical support columns being vertically aligned with a hole through the bottom plate of the plurality of holes through the bottom plate and a hole through the top plate of the plurality of holes through the top plate when the plurality of first vertical support columns is secured between the bottom plate and the top plate and when the plurality of second vertical support columns is secured between the bottom plate and the top plate, respectively.

20. The light bar of claim 13, further comprising:
the peripheral edge configuration of the bottom plate and the peripheral edge configuration of the top plate being a same peripheral edge configuration.

21. The light bar of claim 13, further comprising:
the peripheral edge configuration of the bottom plate and the peripheral edge configuration of the top plate being different peripheral edge configurations.

22. A light bar for a vehicle, the light bar comprising:
a first bottom plate, the first bottom plate having a peripheral edge that defines a first peripheral configuration of the first bottom plate;
a first top plate, the first top plate having a peripheral edge that defines a first peripheral configuration of the top plate;
a plurality of vertical support columns secured between the first bottom plate and the first top plate, the plurality of vertical support columns securing the first bottom plate to the first top plate, each vertical support column of the plurality of vertical support columns having a forward surface and a slot in the forward surface, the slot being a T-slot;
a plurality of illumination devices, each illumination device having a forward lens surface configured for projecting illumination and a rearward mounting surface opposite the forward lens surface, the rearward mounting surface of each illumination device having T-fasteners projecting from the rearward mounting surface and received in engagement in the T-slot of two adjacent vertical support columns of the plurality of vertical support columns, the T-fasteners removably attach the illumination device to the two adjacent vertical support columns of the plurality of vertical support columns;
a second bottom plate, the second bottom plate having a peripheral edge that defines a second peripheral configuration of the second bottom plate;
a second top plate, the second top plate having a peripheral edge that defines a second peripheral configuration of the second top plate; and,
the plurality of vertical support columns secured between the first bottom plate and the first top plate are removable from between the first bottom plate and the first top plate and are securable between the second bottom plate and the second top plate, the plurality of vertical support columns securing the second bottom plate to the second top plate.

23. The light bar of claim 22, further comprising:
the first peripheral configuration of the first bottom plate and the first peripheral configuration of the first top plate being a same peripheral configuration;
the second peripheral configuration of the second bottom plate and the second peripheral configuration of the second top plate being a same peripheral configuration; and,
the first peripheral configuration of the first bottom plate and the first peripheral configuration of the first top plate being different peripheral configurations from the second peripheral configuration of the second bottom plate and the second peripheral configuration of the second top plate.

24. A light bar for a vehicle, the light bar comprising:
a bottom plate;
a top plate;
a plurality of vertical support columns secured between the bottom plate and the top plate, the plurality of vertical support columns securing the bottom plate to the top plate, each vertical support column of the plurality of vertical support columns having a mounting surface, each vertical support column of the plurality of vertical support columns having a slot in the mounting surface of the vertical support column, the slot being a T-slot;
a plurality of illumination devices, each illumination device having a forward lens surface configured for projecting illumination and a rearward mounting surface opposite the forward lens surface, the rearward mounting surface engaging against mounting surfaces of two adjacent vertical support columns of the plurality of vertical support columns; and, at least two fastener assemblies attaching each illumination device to the mounting surfaces of two adjacent vertical support columns of the plurality of vertical support columns, each fastener of the at least two fasteners comprising a screw threaded into a nut configuring the fastener as a T-fastener and a pad secured to the nut, the pad being constructed of a resilient, compressible material, the pads of the at least two T-fasteners being dimensioned to compress as the nuts and the pads secured to the nuts of the at least two T-fasteners are inserted into the T-slots in the mounting surfaces of the two adjacent vertical support columns of the plurality of vertical support columns and the nuts and the pads secured to the nuts are moved to positions of the at least two T-fasteners relative to the T-slots in the mounting surfaces of the two adjacent vertical support columns of the plurality of vertical support columns, and resiliency of the pads secured to the nuts and compressed in the T-slots of the mounting surfaces of the two adjacent vertical support columns of the plurality of vertical support columns being operable to hold the at least two T-fasteners at the positions of the at least two T-fasteners relative to the T-slots in the mounting surfaces of the two adjacent vertical support columns of the plurality of vertical support columns.

25. The light bar of claim 24, further comprising:
the screws of the at least two T-fasteners attaching each illumination device to the mounting surfaces of at least two adjacent vertical support columns of the plurality of vertical support columns being removable from the nuts of the at least two T-fasteners enabling removing the illumination device from the mounting surfaces of the two adjacent vertical support columns of the plurality of vertical support columns with the pads of the at least two T-fasteners holding the nuts of the at least two T-fasteners at the positions of the nuts and pads relative to the T-slots in the mounting surfaces of the two adjacent vertical support columns of the plurality of vertical support columns.

26. The light bar of claim 25, further comprising:
the illumination device mounted to the two adjacent vertical support columns being a lower illumination device; and, an upper illumination device, the upper illumination device having a forward lens surface configured for projecting illumination and a rearward mounting surface opposite the forward lens surface, the rearward mounting surface engaging against the mounting surfaces of the two adjacent vertical support columns of the plurality of vertical support columns; and, at least two additional fasteners attaching the upper illumination device to the mounting surfaces of the two adjacent vertical support columns of the plurality of vertical support columns, each fastener of the at least two additional fasteners comprising a screw threaded into a nut configuring the additional fasteners as additional T-fasteners and a pad secured to the nut, the pad being constructed of a resilient, compressible material, the pads of the at least two additional T-fasteners being dimensioned to compress as the nuts and the pads secured to the nuts of the at least two additional T-fasteners are inserted into the T-slots in the mounting surfaces of the two adjacent vertical support columns of the plurality of vertical support columns and the nuts and pads secured to the nuts are moved to positions of the at least two additional T-fasteners relative to the T-slots in the mounting surfaces of the two adjacent vertical support columns of the plurality of vertical support columns, and resiliency of the pads secured to the nuts and compressed in the T-slots of the mounting surfaces of the two adjacent vertical support columns of the plurality of vertical support columns being operable to hold the at least two additional T-fasteners at the positions of the at least two additional T-fasteners relative to the T-slots in the mounting surfaces of the two adjacent vertical support columns of the plurality of vertical support columns.

27. The light bar of claim 25, further comprising:
the plurality of vertical support columns being a plurality of first vertical support columns secured between the bottom plate and the top plate, each first vertical support column of the plurality of first vertical support columns having a first vertical height dimension;

a plurality of second vertical support columns, each second vertical support column of the plurality of second vertical support columns having a second vertical height dimension, the second vertical height dimension being larger than the first vertical height dimension; and, the plurality of first vertical support columns secured between the bottom plate and the top plate are removable from between the bottom plate and the top plate and are replaceable with the plurality of second vertical support columns secured between the bottom plate and the top plate.

28. The light bar of claim 27, further comprising:
the second vertical height dimension being twice the first vertical height dimension.

29. The light bar of claim 25, further comprising:
a plurality of pairs of adjacent vertical support columns of the plurality of vertical support columns, the plurality of pairs of vertical support columns being arranged in a straight line between the bottom plate and the top plate, the straight line being parallel to a forward edge of the bottom plate and a forward edge of the top plate; and, an illumination device of the plurality of illumination devices being mounted to each pair of adjacent vertical support columns of the plurality of pairs of adjacent vertical support columns.

30. The light bar of claim 25, further comprising:
at least a pair of the plurality of vertical support columns positioned in a line parallel to a left side edge of the bottom plate and parallel to a left side edge of the top plate;

at least a pair of the plurality of vertical support columns positioned in a line parallel to a right side edge of the bottom plate and parallel to a right side edge of the top plate;

an illumination device of the plurality of illumination devices mounted to the pair of vertical support columns positioned in the line parallel to the left side edge of the bottom plate and parallel to the right side edge of the top plate; and, an illumination device of the plurality of illumination devices mounted to the pair of vertical support columns positioned in the line parallel to the right side edge of the bottom plate and parallel to the right side edge of the top plate.

* * * * *